United States Patent [19]
Boyd et al.

[11] Patent Number: 6,017,432
[45] Date of Patent: Jan. 25, 2000

[54] ELECTRODEPOSITABLE COATING COMPOSITIONS AND THEIR USE IN A METHOD OF CATIONIC ELECTRODEPOSITION

[75] Inventors: Donald W. Boyd, Cheswick; Venkatachalam Eswarakrishnan, Allison Park; Gregory J. McCollum, Gibsonia; Robert R. Zwack, Allison Park, all of Pa.

[73] Assignee: PPG Industries Ohio, Inc., Cleveland, Ohio

[21] Appl. No.: 09/102,801

[22] Filed: Jun. 23, 1998

Related U.S. Application Data

[60] Provisional application No. 60/051,653, Jul. 3, 1997.

[51] Int. Cl.$^7$ .................................................... C25D 13/10
[52] U.S. Cl. ........................... 204/501; 204/505; 523/415
[58] Field of Search ..................... 204/501, 505; 523/415

[56] References Cited

U.S. PATENT DOCUMENTS

| | | | |
|---|---|---|---|
| 3,663,389 | 5/1972 | Koral et al. | 204/181 |
| 3,697,479 | 10/1972 | Maycock | 260/47 C |
| 3,793,278 | 2/1974 | De Bona | 260/29.2 EP |
| 3,947,338 | 3/1976 | Jerabek et al. | 204/181 |
| 3,947,339 | 3/1976 | Jerabek et al. | 204/181 |
| 3,959,106 | 5/1976 | Bosso et al. | 204/181 |
| 3,984,299 | 10/1976 | Jerabek | 204/181 |
| 4,007,154 | 2/1977 | Schimmel et al. | 260/37 EP |
| 4,104,147 | 8/1978 | Marchetti et al. | 204/181 C |
| 4,148,772 | 4/1979 | Marchetti et al. | 260/29.2 EP |
| 4,211,862 | 7/1980 | Pechhold et al. | 528/405 |
| 4,366,193 | 12/1982 | Linden et al. | 427/340 |
| 4,423,166 | 12/1983 | Moriarity et al. | 523/414 |
| 4,468,307 | 8/1984 | Wismer et al. | 204/181 C |
| 4,507,412 | 3/1985 | Hickner et al. | 523/454 |
| 4,568,497 | 2/1986 | Mendoza et al. | 260/465 F |
| 4,615,779 | 10/1986 | McCollum et al. | 204/181.7 |
| 4,688,060 | 8/1987 | Tanaka et al. | 503/214 |
| 4,711,917 | 12/1987 | McCollum et al. | 523/400 |
| 4,891,111 | 1/1990 | McCollum et al. | 204/181.7 |
| 4,912,152 | 3/1990 | Nejigaki et al. | 524/729 |
| 4,931,157 | 6/1990 | Valko et al. | 204/181.7 |
| 5,096,556 | 3/1992 | Corrigan et al. | 204/181.7 |
| 5,114,552 | 5/1992 | McCollum et al. | 204/181.7 |
| 5,202,383 | 4/1993 | Moriarity et al. | 525/124 |
| 5,225,453 | 7/1993 | Yamamori | 521/137 |
| 5,254,651 | 10/1993 | Alexanian et al. | 526/232.5 |
| 5,426,174 | 6/1995 | Pourreau et al. | 528/419 |
| 5,630,922 | 5/1997 | Eswarakrishnan et al. | 204/501 |

FOREIGN PATENT DOCUMENTS

WO96/14363  5/1996  WIPO .

*Primary Examiner*—Kishor Mayekar
*Attorney, Agent, or Firm*—Kenneth J. Stachel; Ann Marie Cannoni

[57] ABSTRACT

In accordance with the present invention, an electrodepositable composition and a method of electrodeposition using the composition are provided. The electrodepositable composition comprises (a) an active hydrogen-containing, cationic salt group-containing resin electrodepositable on a cathode; (b) a capped polyisocyanate curing agent; and optionally, (c) a metal-containing catalyst. The capped polyisocyanate curing agent comprises a polyisocyanate at least partially capped with a material having the structure:

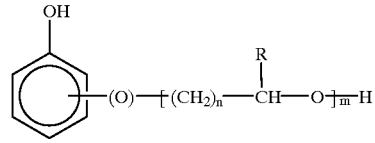

wherein n is a number of 1 to 10; m is a number of 1 to 10 and R is hydrogen or an alkyl or aryl group or substituted alkyl or aryl group having from about 1 to about 30 carbon atoms.

34 Claims, No Drawings

ELECTRODEPOSITABLE COATING COMPOSITIONS AND THEIR USE IN A METHOD OF CATIONIC ELECTRODEPOSITION

This application claims the benefit of U.S. Provisional Application No. 60/051,653, filed Jul. 3, 1997.

BACKGROUND OF THE INVENTION

The present invention relates to aqueous dispersions containing cationic resins and capped polyisocyanate curing agents and to their use in electrodeposition processes.

The application of a coating by electrodeposition involves depositing a film-forming composition to an electrically conductive substrate under the influence of an applied electrical potential. Electrodeposition has gained prominence in the coatings industry because in comparison with non-electrophoretic coating methods, electrodeposition provides higher paint utilization, outstanding corrosion resistance, and low environmental contamination. Early attempts at commercial electrodeposition processes used anionic electrodeposition where the workpiece being coated served as the anode. However, in 1972 cationic electrodeposition was introduced commercially. Since that time cationic electrodeposition has become increasingly popular and today is the most prevalent method of electrodeposition. Throughout the world, the primer coat of choice for corrosion protection of motor vehicles is cationic electrodeposition.

Many cationic electrodeposition compositions used today are based on active hydrogen-containing resins derived from a polyepoxide and a capped aromatic or aliphatic polyisocyanate curing agent.

Typically, an aromatic polyisocyanate curing agent may be capped with an aliphatic alcohol including lower aliphatic alcohols such as methanol, ethanol, and n-butanol, or cycloaliphatic alcohols such as cyclohexanol. Glycol ethers are also conventionally used as capping agents. Such glycol ethers include ethylene glycol butyl ether, diethylene glycol butyl ether, ethylene glycol methyl ether and propylene glycol methyl ether. These conventional capping agents require cure temperatures in excess of 360° F. (182° C.) unless catalysts are used. An aromatic or aliphatic polyisocyanate curing agent may also be capped with phenolic capping agents, wherein the phenolic hydroxyl group reacts with the isocyanate group in the polyisocyanate. Such capping agents deblock and allow for cure at lower temperatures but are known to be chemically unstable in electrodepositable compositions.

To reduce energy costs and to ensure sufficient cure over more massive components such as large parts, metal catalysts are usually included in conventional cationic electrodepositable compositions. Organotin compounds such as dibutyltin oxide, lead salts such as lead silicate, and bismuth salts are examples of such catalysts. In the presence of these catalysts, cure temperatures as low as 340° F. (171° C.) can be achieved with aromatic polyisocyanates. For alcohol blocked aliphatic polyisocyanate curing agents cure temperatures of 380° F. (193° C.) can be achieved. However, catalysts most useful in cationic electrodepositable compositions are either expensive or environmentally undesirable due to their appearance in electrocoat ultrafiltrate waste streams.

Also, the number of effective catalysts available and their ability to reduce cure temperatures below 340° F. (171° C.) for aromatic isocyanates [380° F. (193° C.) for aliphatic isocyanates] while maintaining performance properties such as corrosion resistance is severely limited. Of the known cationic electrodepositable compositions, only those containing lead have exhibited high corrosion resistance over substrates such as bare steel, and this effect is not achievable at temperatures below 340° F. (171° C.) without losing other performance properties, even when higher levels of lead or auxiliary catalysts are added.

Another common approach to producing capped aromatic polyisocyanate curing agents which cure at temperatures below 360° F. (182° C.) is to replace the aliphatic alcohol with a phenol or phenol derivative such as cresol. While these compositions cure at temperatures below 360° F. (182° C.), they exhibit poor chemical stability in electrocoat compositions and can also contaminate electrocoat ultrafiltrate.

Thus, there exists a need for cationic electrodepositable compositions with good stability which rely on minimal levels of metal catalysts that produce high performance, corrosion resistant coating when baked at temperatures below 340° F. (171° C.) for blocked polyaromatic isocyanates and 380° F. (193° C.) for blocked aliphatic polyisocyanates.

SUMMARY OF THE INVENTION

It is an object of the present invention to provide an electrodepositable composition with good stability which demonstrates enhanced cure response; i.e., cure at temperatures below 340° F. (171° C.) for blocked aromatic polyisocyanates and 380° F. (193° C.) for blocked aliphatic polyisocyanates or at low metal catalyst levels with little or no loss of cured film properties or appearance.

It is a further object of the present invention to provide electrodepositable composition with good stability which demonstrates enhanced cured film properties such as corrosion resistance at conventional or lower cure temperatures, and conventional metal catalyst levels.

In accordance with the present invention, an electrodepositable composition and a method of electrodeposition using the composition are provided. The electrodepositable composition comprises (a) an active hydrogen-containing, cationic salt group-containing resin electrodepositable on a cathode; (b) a capped polyisocyanate curing agent; and optionally, (c) a metal-containing catalyst. The capped polyisocyanate curing agent comprises a polyisocyanate at least partially capped with a material having the structure:

(Structure I)

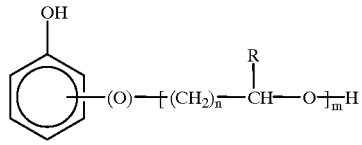

wherein n is a number from 1 to 10; m is a number from 1 to 10; and R is hydrogen or an alkyl or aryl group or substituted alkyl or aryl group having from about 1 to about 30 carbon atoms.

The hydroxyl organo ether substituent as depicted in Structure I can be bonded to the aromatic ring at any ortho position relative to the hydroxyl of the ring and can involve mixtures with substituents at the meta and/or para positions relative to the hydroxyl group of the ring.

DETAILED DESCRIPTION

The cationic resin of (a) above for the present invention may be any suitable cationic resin known to those skilled in the art. For instance, such resin can be the reaction products of epoxide group-containing resins and primary and secondary amines such as those described in U.S. Pat. Nos. 3,663,389; 3,947,338; 3,947,339 and 3,984,299. The cationic resin is preferably derived from a polyepoxide and can be prepared by reacting together a polyepoxide and a polyhydroxyl group-containing material selected from alcoholic hydroxyl group-containing materials and phenolic hydroxyl group-containing materials to chain extend or build the molecular weight of the polyepoxide. The reaction product can then be reacted with a cationic salt-forming group to produce the cationic resin.

A chain extended polyepoxide is typically prepared as follows: the polyepoxide and polyhydroxyl group-containing material are reacted together neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is typically conducted at a temperature of about 80° C. to 160° C. for about 30 to 180 minutes until an epoxy group-containing resinous reaction product is obtained.

The equivalent ratio of reactants; i.e., epoxy:polyhydroxyl group-containing material is typically from about 1.00:0.20 to about 1.00:3.00.

Suitable polyepoxides are those having a 1,2-epoxy equivalency greater than one and preferably at least about two; that is, polyepoxides which have on average two epoxide groups per molecule. In general, the epoxide equivalent weight of the polyepoxide will range from about 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups. The preferred polyepoxides are polyglycidyl ethers of polyhydric alcohols such as cyclic polyols. Particularly preferred are polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Besides polyhydric phenols, other cyclic polyols can be used in preparing the polyglycidyl ethers of cyclic polyols. Examples of other cyclic polyols include alicyclic polyols, particularly cycloaliphatic polyols such as 1,2-cyclohexanediol and 1,2-bis(hydroxymethyl)cyclohexane. The preferred polyepoxides have epoxide equivalent weights ranging from about 180 to 2000, preferably from about 186 to 1200. Epoxy group-containing acrylic polymers can also be used. These polymers typically have an epoxy equivalent weight ranging from about 750 to 2000.

Examples of polyhydroxyl group-containing materials used to chain extend or increase the molecular weight of the polyepoxide (i.e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used. Bisphenol A is preferred.

The active hydrogens associated with the cationic resin include any active hydrogens which are reactive with isocyanates within the temperature range of about 93° C. to 204° C., preferably about 121° C. to 177° C. Typically, the active hydrogens are selected from the group consisting of aliphatic hydroxyl, beta hydroxy alkylamino and primary and secondary amino groups, including mixed groups such as hydroxyl and primary amino. Preferably, the cationic resin will have an active hydrogen content of about 1 to 4 milliequivalents, more preferably about 2 to 3 milliequivalents of active hydrogen per gram of resin solids.

The resin contains cationic salt groups, which are preferably incorporated into the resin molecule as follows: the resinous reaction product prepared as described above is further reacted with a cationic salt group former. By "cationic salt group former", it is meant a material which is reactive with epoxy groups and which can be acidified before, during, or after reaction with the epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt forming groups are sulfides which can be mixed with acid prior to reaction with the epoxy groups and form ternary sulfonium salt groups upon subsequent reaction with the epoxy groups.

When amines are used as the cationic salt formers, monoamines are preferred, and hydroxyl-containing amines are particularly preferred. Polyamines may be used but are not recommended because of a tendency to gel the resin.

Tertiary and secondary amines are preferred to primary amines because primary amines are polyfunctional with respect to epoxy groups and have a greater tendency to gel the reaction mixture. If polyamines or primary amines are used, they should be used in a substantial stoichiometric excess to the epoxy functionality in the polyepoxide so as to prevent gelation and the excess amine should be removed from the reaction mixture by vacuum stripping or other technique at the end of the reaction. The epoxy may be added to the amine to ensure excess amine.

Examples of hydroxyl-containing amines are alkanolamines, dialkanolamines, trialkanolamines, alkyl alkanolamines, and aralkyl alkanolamines containing from 1 to 18 carbon atoms, preferably 1 to 6 carbon atoms in each of the alkanol, alkyl and aryl groups. Specific examples include ethanolamine, N-methylethanolamine, diethanolamine, N-phenylethanolamine, N,N-dimethylethanolamine, N-methyldiethanolamine, triethanolamine, 3-aminopropyldiethanolamine and N-(2-hydroxyethyl)piperazine.

Amines such as mono, di, and trialkylamines and mixed aryl-alkyl amines which do not contain hydroxyl groups or amines substituted with groups other than hydroxyl which do not negatively affect the reaction between the amine and the epoxy may also be used. Specific examples include ethylamine, methylethylamine, triethylamine, N-benzyldimethylamine, dicocoamine and N,N-dimethylcyclohexylamine.

Mixtures of the above-mentioned amines may also be used.

The reaction of a primary and/or secondary amine with the polyepoxide takes place upon mixing of the amine and polyepoxide. The amine may be added to the polyepoxide or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature of about 50° C. to 150° C. may be done to hasten the reaction.

The reaction product of the primary and/or secondary amine and the polyepoxide is made cationic and water dispersible by at least partial neutralization with an acid. Suitable acids include organic and inorganic acids such as formic acid, acetic acid, lactic acid, phosphoric acid and sulfamic acid. By "sulfamic acid", it is meant sulfamic acid itself or derivatives thereof; i.e., an acid of the formula:

wherein R is hydrogen or an alkyl group having 1 to 4 carbon atoms. Sulfamic acid is preferred. Mixtures of the above-mentioned acids may also be used.

The extent of neutralization varies with the particular reaction product involved. However, sufficient acid should be used to disperse the electrodepositable composition in water. Typically, the amount of acid used provides at least 20 percent of all of the total neutralization. Excess acid may also be used beyond the amount required for 100 percent total neutralization.

In the reaction of a tertiary amine with a polyepoxide, the tertiary amine can be prereacted with the neutralizing acid to form the amine salt and then the amine salt reacted with the polyepoxide to form a quaternary salt group-containing resin. The reaction is conducted by mixing the amine salt with the polyepoxide in water. Typically, the water is present in an amount ranging from about 1.75 to about 20 percent by weight based on total reaction mixture solids.

In forming the quaternary ammonium salt group-containing resin, the reaction temperature can be varied from the lowest temperature at which the reaction will proceed, generally room temperature or slightly thereabove, to a maximum temperature of about 100° C. (at atmospheric pressure). At higher pressures, higher reaction temperatures may be used. Preferably, the reaction temperature is in the range of about 60° C. to 100° C. Solvents such as a sterically hindered ester, ether, or sterically hindered ketone may be used, but their use is not necessary.

In addition to the primary, secondary, and tertiary amines disclosed above, a portion of the amine that is reacted with the polyepoxide can be a ketimine of a polyamine, such as is described in U.S. Pat. No. 4,104,147, column 6, line 23 to column 7, line 23. The ketimine groups decompose upon dispersing the amine-epoxy resin reaction product in water.

In addition to resins containing amine salts and quaternary ammonium salt groups, cationic resins containing ternary sulfonium groups may be used in the composition of the present invention. Examples of these resins and their method of preparation are described in U.S. Pat. Nos. 3,793,278 to DeBona and 3,959,106 to Bosso, et al.

The extent of cationic salt group formation should be such that when the resin is mixed with an aqueous medium and other ingredients, a stable dispersion of the electrodepositable composition will form. By "stable dispersion", it is meant one that does not settle or is easily redispersible if some settling occurs, and one that is fairly shear stable to allow for pumping of the dispersion. Such stability is effective so that substrates can be electrocoated with the composition. Also the stability of the dispersion of the present invention with the capping agents disclosed herein permits coating out of the electrocoat on substrates and curability of the coating even after several months. This is as opposed to electrocoating compositions with phenol or cresol capping agents that tend to uncap in a bath of the electrocoating composition and result in an increase of molecular weight and instability of the composition. Moreover, the dispersion should be of sufficient cationic character that the dispersed resin particles will migrate toward and electrodeposit on a cathode when an electrical potential is set up between an anode and a cathode immersed in the aqueous dispersion.

Generally, the active hydrogen-containing cationic salt group-containing resin in the electrodepositable composition of the present invention contains from about 0.1 to 3.0, preferably from about 0.1 to 0.7 milliequivalents of cationic salt group per gram of resin solids. The cationic resin is preferably non-gelled, having a number average molecular weight ranging from about 2000 to about 15,000, preferably from about 5000 to about 10,000. By "non-gelled", it is meant that the resin is substantially free from crosslinking, and prior to cationic salt group formation, the resin has a measurable intrinsic viscosity when dissolved in a suitable solvent. In contrast, a gelled resin having an essentially infinite molecular weight would have an intrinsic viscosity too high to measure. The active hydrogen-containing cationic salt group-containing electrodepositable resin is usually present in the electrodepositable composition in an amount ranging from about 40 to 90 percent by weight, preferably from about 50 to 80 percent by weight based on the total weight of resin solids.

The electrodepositable composition of the present invention also contains a capped polyisocyanate curing agent. The polyisocyanate curing agent may be a fully capped polyisocyanate with substantially no free isocyanate groups, or it may be partially capped and reacted with the resin backbone as described in U.S. Pat. No. 3,984,299. The polyisocyanate can be aliphatic, aromatic, or alicyclic polyisocyanate compounds, but is preferably an aromatic polyisocyanate. Examples of suitable isocyanates are those disclosed in U.S. Pat. Nos. 5,202,383, 5,114,552; 4,711,917 and 4,615,779, hereby incorporated by reference. Diisocyanates are preferred, although higher polyisocyanates can be used in place of or in combination with diisocyanates.

Examples of suitable diisocyanates are p-phenylene diisocyanate, diphenylmethane-4,4'-diisocyanate, 2,4- or 2,6-toluene diisocyanate, diphenyl-2,4'-diisocyanate, diphenyl-4,4'-diisocyanate, diphenyl methane diisocyanate, and any mixtures of these. Examples of suitable higher polyisocyanates are triphenylmethane-4,4',4"-triisocyanate, 1,2,4-benzene triisocyanate and polymethylene polyphenyl isocyanate.

Aromatic isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used.

Aliphatic polyisocyanates can also be used such as isophorone diisocyanate, dicyclohexylmethane-4,4'-diisocyanate, or hexamethylene diisocyanate and trimers thereof. However, the cure temperature of these alcohol blocked isocyanates is generally higher than 380° F. (193° C.), even with metal catalysts. Aliphatic isocyanates can be used if higher UV resistance is required in the cured electrocoat film.

The capping agent for the polyisocyanate in the composition of the present invention includes materials meeting the structure of the Structure I above. For example, the ortho arrangement for the structure is:

(Structure II)

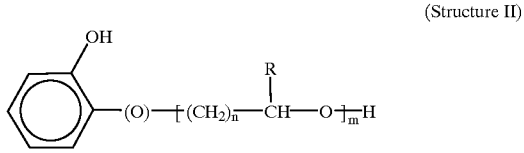

wherein n is a number from 1 to 10, for instance 1 to 5 can be suitable; m is a number from 1 to 10; and R is hydrogen or an alkyl or aryl group or substituted alkyl or aryl group having from about 1 to about 30 carbon atoms. The integers n and m are preferably 1. R may be linear or branched aliphatic such as alkyl, including ethyl, 1- or 2-methyl ethyl, propyl, isomers of dimethyl propyl, butyl, pentyl, and the like; cycloaliphatic; aromatic; aralkyl; or alkaryl; and may be substituted. Examples of substituents include hydroxyl, amino, and the like. R may include functional linkages such as urethane, ester, ether, amide, and the like. R is preferably a hydrogen or a methyl group.

The capping agent with two oxygens bonded to the ring may be prepared by any method known in the art such as reacting catechol with an epoxide group-containing compound or alkylene oxide compound. Such a reaction may take place under conditions typically employed when reacting phenolic compounds with epoxides.

Examples of suitable epoxide group-containing compounds include ethylene oxide, propylene oxide, glycidol, 1,2-pentene oxide, styrene oxide, butylene oxide, epichlorohydrin to polyhydric compounds such as ethylene glycol, propylene glycol, diethylene glycol, dipropylene glycol, trimethylolpropane, and mixtures or blends thereof. Larger monoepoxides such as glycidyl esters and ethers containing from about 8 to about 30 carbon atoms may also be used. Examples of glycidyl ethers are glycidyl ethers of alcohols and phenols such as butyl glycidyl ether, octyl glycidyl ether, phenyl glycidyl ether and para-(tertiary-butyl)phenyl glycidyl ether.

Examples of glycidyl esters are those of the structure:

(Structure III)

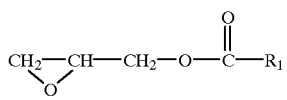

wherein $R_1$ is a hydrocarbon radical containing from about 4 to about 26 carbon atoms. Glycidyl esters of commercially available mixtures of tertiary aliphatic carboxylic acids such as those available from Shell Chemical Company as VERSATIC ACID 911 are suitable. The glycidyl esters themselves are also commercially available from Shell Chemical Company as CARDURA E.

Examples of suitable capping agents include the reaction products of alkylene oxides such as ethylene oxide or propylene oxide or both with catechol alone or in addition to resorcinol, cresorcinol or their homologues having two hydroxyls at the ortho, meta, or para positions to each other. Preferably, the phenolic compound, dihydroxybenzene, is catechol and the alkylene oxide reactant is ethylene oxide and/or propylene oxide. These reaction products can be produced using a mole ratio of the phenolic compound to the alkylene oxide of about 1 to 1 up to a ratio of about 1 to 3 or more, even up to 30. The capping agent is monosubstituted with an ether substituent at one of the hydroxyl groups of the dihydroxybenzene. The reaction can involve etherification of one of the hydroxyl groups of catechol, which can occur in the presence of ferric chloride or similar catalyst. Alternatively, such etherification reaction can be conducted using epichlorohydrin or similar material in the presence of catalytic amine hydrochloride. Other reaction methods known to those skilled in the art can be used. Suitable preferred capping agents include: 2-(2-hydroxy (1 or 2-methyl-)ethoxy[(1 or 2-methyl)oxyethylene]$_{Y-1)}$)phenol, wherein Y is a numeral of 1, 2, or 3 or a mixture of these compounds and with any of these numerals; and 2-(2-hydroxyethoxy[oxyethylene]$_{Y-1)}$)phenol; and mixtures thereof.

With any of the capping agents, the reaction product with the isocyanate or polyisocyanate can involve amounts of the reactants such that the equivalent ratio of the aliphatic hydroxyls to the NCO groups of the isocyanate or polyisocyanate can range in a ratio from about 0.05 to 1 up to 1:1. The capped polyisocyanate curing agent is present in an effective amount to result in the desired level of free isocyanate in the composition and is generally prepared by methods known in the art. The capped polyisocyanate curing agent may be prepared by reacting the polyisocyanate with the capping agent using conditions and catalysts typically employed when reacting polyisocyanates with active hydrogen-containing materials. For instance, the capping agent can be reacted with the polyisocyanate compound according to a conventional method, for example, in the presence or absence of a solvent containing no active hydrogen and capable of dissolving the capping agent, at a temperature in the range from room temperature to about 90° C. for about 0.5 hours or more, whereby a capped polyisocyanate compound can be prepared. The capped polyisocyanate curing agent is usually present in the electrodepositable composition in an amount ranging from about 1 to about 60 percent by weight, preferably from about 25 to about 50 percent by weight based on total weight of resin solids. These capping agents on the polyisocyanate provide good stability for the composition usually better than that provided by the cresol-type capping agents.

Metal catalysts are optionally present in the electrodepositable composition of the present invention, normally in the form of a dispersion or as an aqueous solution of a metal salt. The catalysts, which are often solids, are typically dispersed in a conventional pigment grinding vehicle such as those disclosed in U.S. Pat. No. 4,007,154 by a grinding or milling process. If the catalyst is water soluble, it may simply be dissolved in water. The catalysts are typically used in amounts of about 0.05 to about 2 percent by weight metal based on weight of total solids in the composition of the present invention. Suitable catalysts include tin compounds such as dioctyltin oxide and dibutyltin oxide, and lead-containing compounds such as lead silicate, lead cyanamide, lead oxide, and lead salts. Bismuth-, manganese-, zinc-, iron-, and other metal-containing compounds as known to those skilled in the art are also suitable. Mixtures of the above-mentioned metal compounds may also be used. Surprisingly, the blocked isocyanates prepared from the above-described capping agent are more responsive to catalysis and can be effectively catalyzed by a broader variety of metals than conventional blocked isocyanates.

The electrodepositable composition of the present invention may also contain an acid functional compound to further improve cure response and appearance of the deposited film. The acid functional compound is water immiscible so as to be electrodepositable on the cathode and has a hydrocarbon chain (excluding carbon atoms associated with the acid functionality) of at least 5 carbon atoms, preferably from about 5 to about 34 carbon atoms.

Preferred acid functional compounds are carboxylic acids. The acid functional compound may contain more than one acid functional group. Examples of aliphatic saturated carboxylic acids include isodecanoic acid, lauric acid, hexanoic acid, dimer fatty acid, and stearic acid. Examples of aliphatic unsaturated carboxylic acids include oleic acid, 9–11 octadecadienoic acid, 9–12 octadecadienoic acid (linoleic acid), linolenic acid, abietic acid, including natural sources of abietic acid, and mixtures thereof. Natural sources of abietic acid of varying purity include gum rosin, wood rosin, and tall oil rosin. Examples of substituted carboxylic acids include free acid carboxylic compounds like 12-hydroxy stearic acid But when used, abietic acid is preferred.

When present, the acid functional compound is usually added to the electrodepositable composition in an amount ranging from about 0.1 to about 3.0 percent by weight based on weight of main vehicle resin solids. The meaning of this weight term is the weight of the active hydrogen-containing cationic resin and capped polyisocyanate curing agent. The preferred amount is from about 0.3 to about 1.5 percent by weight based on weight of main vehicle resin solids.

The electrodepositable composition may also optionally contain a coalescing solvent such as hydrocarbons, alcohols, esters, ethers and ketones. Examples of preferred coalescing solvents are alcohols, including polyols, such as isopropanol, butanol, 2-ethylhexanol, ethylene glycol and propylene glycol; ethers such as the monobutyl and monohexyl ethers of ethylene glycol; and ketones such as methyl isobutyl ketone and isophorone. The coalescing solvent is usually present in an amount up to about 40 percent by weight, preferably ranging from about 0.05 to about 25 percent by weight based on total weight of the electrodepositable composition.

The electrodepositable composition of the present invention may further contain pigments and various other optional additives such as plasticizers, surfactants, wetting agents, defoamers, and anti-cratering agents.

Examples of suitable surfactants and wetting agents include alkyl imidazolines such as those available from Geigy Industrial Chemicals as GEIGY AMINE C, and acetylenic alcohols available from Air Products and Chemicals as SURFYNOL. Examples of defoamers include a hydrocarbon containing inert diatomaceous earth available from Crucible Materials Corp. as FOAMKILL 63. Examples of anti-cratering agents are polyepoxide-polyoxyalkylene-polyamine reaction products such as those described in U.S. Pat. No. 4,423,166. These optional ingredients, when present, are usually used in an amount up to 30 percent by weight, typically about 1 to about 20 percent by weight based on weight of resin solids.

Suitable pigments include, for example, iron oxides, lead oxides, strontium chromate, carbon black, coal dust, titanium dioxide, talc, clay, silica, lead silicate, and barium sulfate, as well as color pigments such as cadmium yellow, cadmium red, chromium yellow, and the like. The pigment content of the aqueous dispersion, generally expressed as the pigment to resin (or pigment to binder) ratio (P/B) is usually about 0.05:1 to about 1:1.

The composition of the present invention comprising the cationic resin, the capped polyisocyanate curing agent, the catalyst, and the optional additives mentioned above is used in an electrodeposition process in the form of an aqueous dispersion. By "dispersion", it is meant a two-phase transparent, translucent, or opaque aqueous resinous system in which the resin, pigment, and water insoluble materials are in the dispersed phase while water and water soluble materials comprise the continuous phase. The dispersed phase has an average particle size less than about 10 microns, preferably less than 5 microns. The aqueous dispersion preferably contains at least about 0.05 and usually about 0.05 to about 50 percent by weight resin solids, depending on the particular end use of the dispersion. Such a dispersion is a stable dispersion as is defined above.

The electrodepositable composition of the present invention demonstrates improved cure response when used in an electrocoating process. This means that the temperature range for curing the electrodepositable composition of the present invention may be about 200° F. to 325° F. (93.3° C. to 162.7° C.), as opposed to 325° F. to 400° F. (162.7° C. to 204.4° C.) for conventional electrodepositable compositions at conventional metal catalyst levels; i.e., about 0.2 to about 2.0 percent by weight metal based on the weight of total solids. Moreover, the cure rate is improved; i.e., at a given temperature, a deposited film of the present invention cures more quickly than a comparable film containing conventionally capped polyisocyanates, as measured by rate of weight loss of a deposited film during baking. Alternatively, the amount of metal catalyst can be reduced while maintaining cure at normal temperatures. Improved cure response is also demonstrated by the composition of the present invention through improved film properties such as corrosion resistance when using conventional cure temperatures and catalyst levels.

In the process of electrodeposition, the aqueous dispersion is placed in contact with an electrically conductive anode and cathode. Upon passage of an electric current between the anode and cathode while they are in contact with the aqueous dispersion, an adherent film of the electrodepositable composition will deposit in a substantially continuous manner on the cathode. The film will contain the active hydrogen-containing resin, the capped polyisocyanate curing agent, the catalyst, and the optional additives from the non-aqueous phase of the dispersion. Electrodeposition is usually carried out at a constant voltage in the range of from about 1 volt to several thousand volts, typically between 50 and 500 volts. Current density is usually between about 1.0 ampere and 15 amperes per square foot (10.8 to 161.5 amperes per square meter) and tends to decrease quickly during the electrodeposition process, indicating formation of a continuous self-insulating film. Any electroconductive substrate, especially metal substrates such as steel, zinc, aluminum, copper, magnesium or the like can be coated with the electrodepositable composition of the present invention. Steel substrates are preferred. It is customary to pretreat the substrate with a phosphate conversion, usually a zinc phosphate conversion coating, followed by a rinse which seals the conversion coating.

After electrodeposition, the coating is heated to cure the deposited composition. The heating or curing operation is usually carried out at a temperature in the range of from 200 to 400° F. (93.3 to 204.4° C.), preferably from 250 to 340° F. (121.1 to 171.1° C.) for a period of time ranging from 10 to 60 minutes. The thickness of the resultant film is usually from about 10 to 50 microns.

The invention will be further described by reference to the following examples. Unless otherwise indicated, all parts are by weight.

EXAMPLES

In the following examples seven different capped crosslinkers were used to prepare electrodeposition coating baths where for some examples of a particular blocked crosslinker several baths were prepared using different catalyst systems. Separate panels were coated in each of the coating baths, and the panels were tested for solvent resistance (Double Acetone Rubs) and cure rate (TGA test).

The examples were conducted in four series where seven different Electrodeposition Resins were prepared as shown in Table I below. The electrodeposition Resins were prepared into seven different Main Vehicles with the use of the seven different blocked isocyanate crosslinking agents. In the three examples for the first series, I, the capped crosslinker was the same as was the Main Vehicle. These and the Main Vehicles of series II, III, and IV were used to make nine electrodeposition coating baths as shown in Table II, where there were three different baths for Series I, three different baths for series II, one bath for series III, and two different baths for series IV.

Example IA

This example describes the preparation of a crosslinker utilizing 2-(2-hydroxyethoxyphenol) as a sole blocking agent, a cationic electrodeposition resin containing this crosslinker, and a cationic electrodeposition bath containing this resin and crosslinker.

The cationically electrodepositable Main Vehicle was prepared as shown in table I where the capped crosslinker was prepared as follows:

| Ingredients | Parts by Weight |
|---|---|
| 2-(2-Hydroxyethoxy phenol)[1] | 770.85 |
| Methyl isobutyl ketone | 482.23 |
| Dibutyltin dilaurate | 0.5 |
| Polymeric MDI[2] | 660 |
| Methyl isobutyl ketone | 20 |

[1]commercially available from Aldrich Chemical Company, Inc.
[2]Polymeric MDI (diphenylmethane diisocyanate) available from DOW CHEMICAL as PAPI 2940.

The 2-(2-hydroxyethoxyphenol), methyl isobutyl ketone and dibutyltin dilaurate were charged to a reaction flask under a nitrogen atmosphere and heated to 70° C. To this solution was added PAPI 2940 slowly keeping the reaction temperature below 80° C. Upon completion of the addition, a second charge of methyl isobutyl ketone was added and the mixture held at 85° C. until infrared analysis indicated no unreacted NCO remained.

The Main Vehicles of Table I were prepared by one of four methods that differed in the approach to adding the crosslinker and dispersing the Main Vehicle in water. The Main Vehicles for Examples IA, IB, IC and III were made in the same manner, whereas those for Examples IIB, and IIC, were made in a similar manner to the first except oleic acid was not included in the resin. For Example IIA, the main vehicle, excluding oleic acid, was dispersed in water before the addition of the crosslinker. The preparation of the Main Vehicle of Examples IVA and IVB was similar to the first approach but differed in excluding oleic acid and in the time and in the temperature maintained after the crosslinker was added.

All of the Main Vehicles of Table I had the Electrodeposition Resin made in the following manner. The EPON 828, initial charge of Bisphenol A-ethylene oxide adduct, Bisphenol A, and the initial charge of methyl isobutyl ketone were charged to a reaction vessel and heated under a nitrogen atmosphere to 125° C. Ethyl triphenyl phosphonium iodide was added and the reaction mixture allowed to exotherm to about 145° C. The reaction was held at 145° C. for two hours and the second charge of Bisphenol A-ethylene oxide adduct was added and the epoxy equivalent weight was measured. The epoxy equivalent was close to the target epoxy equivalent weight. The reaction was cooled to 95° C., and the second charge of methyl isobutyl ketone, the diketimine and N-methylethanolamine were added in succession. The mixture was allowed to exotherm and then a temperature of 125° C. was established. The mixture was held at 125° C. for one hour.

For the first approach of Examples IA, IB, IC and III, the crosslinker was added and the reaction mixture was stirred for 15 minutes at 105° C.

For Example IA, the resin mixture including the crosslinker (1200 parts) was dispersed in aqueous medium by adding it to a mixture of 25.40 parts of sulfamic acid and

TABLE I

Main Vehicles

Examples (Parts by Weight)

| Material | I | IIA | IIB | IIC | III | IVA | IVB |
|---|---|---|---|---|---|---|---|
| EPON 828[3] | 430.27 | 614.68 | 491.74 | 491.74 | 399.54 | 491.74 | 473.30 |
| Bisphenol A-ethylene oxide adduct (1/6 molar ratio) | 87.5 | 125 | 100.0 | 100.0 | 81.25 | 100.0 | 96.25 |
| Bisphenol A | 185.8 | 265.42 | 212.34 | 212.34 | 172.53 | 212.34 | 204.38 |
| Methyl isobutyl ketone | 14.36 | 20.51 | 16.41 | 16.41 | 13.33 | 16.41 | 15.79 |
| Ethyltriphenyl phosphonium iodide | 0.42 | 0.6 | 0.48 | 0.48 | 0.39 | 0.48 | 0.46 |
| Bisphenol A-ethylene oxide adduct (1/6 molar ratio) | 87.5 | 125 | 100.0 | 100.0 | 81.25 | 100.0 | 96.25 |
| Methyl isobutyl ketone | 0.81 | 70.62 | 6.74 | 1.64 | 7.19 | 2.48 | 1.48 |
| Diketimine[4] | 39.9 | 57.01 | 45.61 | 45.61 | 37.05 | 50.97 | 49.06 |
| N-methyl ethanol amine | 34.07 | 48.68 | 38.94 | 38.94 | 31.64 | 43.52 | 41.89 |
| Crosslinker | | | | | | | |
| Eg. IA | 608.56 | | | | | — | — |
| Eg. IIA Part (ii) | | 610.13 | | | | — | — |
| Eg. IIB | | | 860.28 | | | — | — |
| Eg. IIC | | | | 997.27 | | — | — |
| Eg. III | | | | | 565.09 | | — |
| Eg. IVA | | | | | | 786.06 | |
| Eg. IVB | | | | | | | 795.88 |

[3]Polyglycidyl ether of Bisphenol A, available from Shell Oil and Chemical Co.
[4]Diketimine derived from diethylenetriamine and methyl isobutyl ketone (73% solids in methyl isobutyl ketone).

In the above Table I, the abbreviation "Eg." indicates "Example".

714.35 parts of deionized water. After 30 minutes, 10.37 parts of oleic acid was added and the dispersion was further thinned with 433.36 parts of deionized water and 439.06 parts of deionized water in stages and vacuum stripped to remove organic solvent to give a dispersion having a solids content of 45.64 weight percent and a particle size of 890 Angstroms (Å).

For Examples IB and IC the dispersion of Main Vehicle had a resulting solids of 40.84 percent and a resulting particle size of 870 Å.

For Example IIA, 900 parts of the resin mixture were dispersed in aqueous medium by adding to a mixture of 21.8 parts of sulfamic acid and 590.57 parts of deionized water. After 30 minutes, 610.13 parts crosslinker was added and the mixture stirred for 30 minutes more. The dispersion was further thinned with 8.72 parts sulfamic in 300 parts of water and 985 parts of deionized water in stages and vacuum stripped to remove organic solvent to give a dispersion having a solids content of 48.52 weight percent and a particle size of 1040 Å.

For Example IIB, after the crosslinker was added and the reaction mixture stirred for 15 minutes at 105° C., the resin mixture (1500 parts) was dispersed in aqueous medium by adding it to a mixture of 28.85 parts of sulfamic acid and 855.43 parts of deionized water. After 60 minutes, the dispersion was further thinned with 529.84 parts of deionized water and 536.81 parts of deionized water in stages and vacuum stripped to remove organic solvent to give a dispersion having a solids content of 40.70 weight percent and a particle size of 910 Å.

For Example IIC, the resin mixture in an amount of (1600 parts) which included the crosslinker was dispersed in aqueous medium by adding it to a mixture of 28.75 parts of sulfamic acid and 896.25 parts of deionized water. After 60 minutes, the dispersion was further thinned with 561.11 parts of deionized water and 568.49 parts of deionized water in stages and vacuum stripped to remove organic solvent to give a dispersion having a solids content of 44.70 weight percent and a particle size of 900 Å.

For Example III, the resin mixture in an amount of (1100 parts) which included the crosslinker was dispersed in aqueous medium by adding it to a mixture of 23.17 parts of sulfamic acid and 638.96 parts of deionized water. After 60 minutes, the dispersion was further thinned with 391.58 parts of deionized water and 396.74 parts of deionized water in stages and vacuum stripped to remove organic solvent to give a dispersion having a solids content of 43.23 weight percent and a particle size of 2410 Å.

For Example IVA after the addition of the crosslinker, the reaction mixture was stirred for 30 minutes at 95° C. The resin mixture (1500 parts) was dispersed in aqueous medium by adding it to a mixture of 33.47 parts of sulfamic acid and 872.84 parts of deionized water. After 60 minutes, the dispersion was further thinned with 534.74 parts of deionized water and 541.77 parts of deionized water in stages and vacuum stripped to remove organic solvent to give a dispersion having a solids content of 41.35 weight percent and a particle size of 1070 Å.

For Example IVB after the addition of the crosslinker, the reaction mixture was stirred for 30 minutes at 90° C. The resin mixture (1400 parts) was dispersed in aqueous medium by adding it to a mixture of 30.57 parts of sulfamic acid and 809.01 parts of deionized water. After 60 minutes, the dispersion was further thinned with 497.68 parts of deionized water and 504.23 parts of deionized water in stages and vacuum stripped to remove organic solvent to give a dispersion having a solids content of 39.62 weight percent and a particle size of 870 Å.

Example IB

This example is a lead-free version of Example IA.

A main vehicle was prepared exactly as in Example IA for Table I {hereinafter IB Part (i)}.

Part (ii)

A pigment grinding vehicle was prepared by first preparing a quaternizing agent followed by reacting the quaternizing agent with an epoxy resin. The quaternizing agent was prepared as follows:

| Material | Solution weight (grams) |
| --- | --- |
| 2-ethylhexanol half-capped toluene diisocyanate, 95% in MIBK | 320 |
| dimethylethanolamine (DMEA) | 87.2 |
| aqueous lactic acid solution, 88% | 117.6 |
| 2-butoxyethanol | 39.2 |

The 2-ethylhexanol half-capped toluene diisocyanate was added to the DMEA in a suitable reaction vessel at room temperature. The mixture exothermed and was stirred for one hour at 80° C. The aqueous lactic acid solution was then charged followed by addition of 2-butoxyethanol. The reaction mixture was stirred for about one hour at 65° C. to form the quaternizing agent.

Part (iii)

The pigment grinding vehicle was prepared as follows:

| Material | Solution weight (grams) |
| --- | --- |
| EPON 829[5] | 710 |
| Bisphenol A | 289.6 |
| 2-ethylhexanol half-capped toluene diisocyanate, 95% in MIBK | 406 |
| quaternizing agent described above {IB(ii)} | 496.3 |
| deionized water | 71.2 |
| 2-butoxyethanol | 1205.6 |

[5]Diglycidyl ether of Bisphenol A available from Shell Oil and Chemical Co.

The EPON 829 and Bisphenol A were charged under a nitrogen atmosphere to a suitable reactor and heated to 150° C. to 160° C. to initiate an exotherm. The reaction mixture was permitted to exotherm for one hour at 150° C. to 160° C. The reaction mixture was then cooled to 120° C. and the 2-ethylhexanol half-capped toluene diisocyanate added. The temperature of the reaction mixture was held at 110° C. to 120° C. for one hour followed by the addition of the 2-butoxyethanol. The reaction mixture was then cooled to 85° C. to 90° C., homogenized, and charged with water followed by the quaternizing agent. The temperature of the reaction mixture was held at 80° C. to 85° C. until an acid value of about 1 was obtained. The final product had a solids content of about weight 55 percent.

Part (iv)

A dibutyltin oxide catalyst paste was prepared from the following ingredients:

| Material | Parts by Weight |
| --- | --- |
| Above grinding vehicle {IB Part (iii)} | 212.4 |
| Dibutyltin oxide | 300.0 |
| Deionized water | 400.0 |
| Total | 912.4 |

The paste was sand milled to a Hegman reading of 7.

Part (v)

A lead-free pigment paste was prepared from the following ingredients:

| Material | Parts by Weight |
| --- | --- |
| Above grinding vehicle {IB Part (iii)} | 1096.0 |
| Titanium dioxide[6] | 2520.0 |
| Clay[7] | 1224.0 |
| Carbon black[8] | 128.0 |
| Above catalyst paste | 968.0 |
| Deionized water | 2064.0 |
| Total | 8000.0 |

[6]Available from E. I. DuPont de Nemours and Company as R-900.
[7]Available from Engelhard Corp. as ASP-200.
[8]Available from the Columbian Division of Cities Service Co. as Raven 410.

A cationic electrodeposition bath was prepared from the ingredients indicated in Table II for Example IB:

Example IC

This example is a tin-free version of Example IA where except for the tin-free paste everything was the same as that for Example IA. The tin-free paste was prepared from the following ingredients.

Part (i)

| Ingredients | Parts by Weight |
| --- | --- |
| Pigment grinding vehicle of Example {IB Part (iii)} | 1515.5 |
| Deionized water | 2954.2 |
| Titanium dioxide | 2712.5 |
| Aluminum silicate | 1582.5 |
| Carbon black | 134.5 |
| Basic lead silicate[9] | 570.5 |
| Total | 9469.7 |

[9]Available from Eagle-Picher Industries, Inc. as EP202.

The paste was sand milled to a Hegman reading of 7.

Example II

Example II series describes the preparation and testing of electrocoats based on the reaction product of catechol with Y moles of propylene oxide [2-(2-hydroxy(1 or 2-methyl) ethoxy[(1 or 2-methyl)oxyethylene]$_{Y-1)}$phenol] as capping agents, where Y is a numeral of 1, 2, or 3 in the different examples.

Example IIA

This example illustrates the use of 2-(2-hydroxypropoxy) phenol as a capping alcohol for the polyisocyanate crosslinking agent for the Main Vehicle.

Part (i)

Monopropoxylated catechol also referred to as 2-(2-hydroxypropoxy) phenol was prepared from the following ingredients:

| Ingredients | Parts by Weight |
| --- | --- |
| Catechol | 1000 |
| Iron (III) chloride | 1.00 |
| Propylene oxide | 580 |
| Methyl isobutyl ketone | 1000 |

Charge catechol and iron chloride to the reactor and pressure with nitrogen to 5 pounds/inch$^2$ gauge, (psig) (1.36 Bars. Heat to 110° C. and feed in propylene oxide. The feed rate should be such that the pressure does not exceed 10 psig (2.72 Bars) and temperature was maintained at ~110° C. After the addition, hold at 110° C. for two hours. Then vacuum strip to remove any unreacted propylene oxide. Add methyl isobutyl ketone (MIBK) and let the reaction cool to 60° C. Wash the MIBK solution three times with a 5 percent aqueous sodium metaborate solution, once with water, and remove water by azeotropic distillation. Final solids was 64.4 weight percent.

Part (ii)

A Main Vehicle was prepared as shown in Table I above. The capped polyisocyanate crosslinker for the Main Vehicle was prepared from the following ingredients:

| Ingredients | Parts by Weight |
| --- | --- |
| Catechol: 1 propylene oxide adduct in methyl isobutyl ketone, 64.4% solids | 652.48 |
| Methyl isobutyl ketone | 2.27 |
| Dibutyltin dilaurate | 0.25 |
| Polymeric MDI[2] | 330.00 |
| Methyl isobutyl ketone | 15 |

[2]See footnote "2" above for Polymeric MDI available from Dow Chemical as PAPI 2940.

The Catechol: 1 propylene oxide adduct in methyl isobutyl ketone, was used to prepare the capped polyisocyanate crosslinking agent in the same manner as Example IA above.

A cationic electrodeposition bath was prepared from the ingredients indicated in Table II for Example IIA:

Example IIB

This example illustrates the use of 2-(2-hydroxypropoxy(1 and 2-methylethoxy)) phenol as a capping alcohol for the polyisocyanate crosslinking agent.

A propoxylated catechol was prepared in a manner similar to that in Example IIA except that twice the amount of propylene oxide was used to oxyalkylate catechol. The final product was at 72.4 percent solids in MIBK.

A main vehicle was prepared as shown in Table I above. The capped polyisocyanate crosslinker for the Main Vehicle was prepared from the following mixture of ingredients:

| Ingredients | Parts by Weight |
| --- | --- |
| Catechol: 2-propylene oxide adduct in methyl isobutyl ketone, 72.4% solids | 780.82 |
| Methyl isobutyl ketone | 62.27 |
| Dibutyltin dilaurate | 0.25 |
| Polymeric MDI[a] | 330.00 |
| Methyl isobutyl ketone | 20 |

[a]see footnote "2" above for Polymeric MDI available from Dow Chemical as PAPI 2940.

The Catechol: 2-propylene oxide adduct in methyl isobutyl ketone was added to the other components in a manner similar to that of Example IIA above.

A cationic electrodeposition bath was prepared in a manner as noted for Table II.

Example IIC

This example illustrates the use of 2-(2-hydroxypropoxy(1 and 2-methylethoxy)$_2$-phenol as a capping alcohol.

A propoxylated catechol was prepared in a manner similar to that in Example IIA except that three times the amount of propylene oxide was used so that the final product was 2-(2-hydroxypropoxy)$_3$ phenol at 69.4 percent solids in MIBK.

A main vehicle was prepared as noted in Table I above. The capped polyisocyanate crosslinker for the Main Vehicle was prepared from the following ingredients:

| Ingredients | Parts by Weight |
|---|---|
| Catechol: 3-propylene oxide adduct in methyl isobutyl ketone, 69.4% solids | 982.42 |
| Methyl isobutyl ketone | 12.54 |
| Dibutyltin dilaurate | 0.24 |
| Polymeric MDI[a] | 316.80 |
| Methyl isobutyl ketone | 19.20 |

[a]Polymeric MDI available from Dow Chemical as PAPI 2940.

The Catechol: 3-propylene oxide adduct was added to the other materials in a manner similar to that for Examples IIA and IIB.

A cationic electrodeposition bath was prepared as shown in Table II below.

Example III

This example illustrates the use of a commercial source of 2-(2-hydroxyethoxyphenol). The material was purified before preparation of crosslinker and resin.

A main vehicle was prepared as noted in Table I above. The capped polyisocyanate crosslinker was prepared from the following ingredients:

| Ingredients | Parts by Weight |
|---|---|
| 2-Hydroxy ethoxy phenol | 277.51 |
| Methyl isobutyl ketone | 173.60 |
| Dibutyltin dilaurate | 0.18 |
| Polymeric MDI[a] | 237.60 |
| Methyl isobutyl ketone | 7.2 |

[a]See footnote "2" for polymeric MDI available from Dow Chemical as PAPI 2940.

The 2-Hydroxy ethoxy phenol from APIN Chemical Ltd. was dissolved in methyl isobutyl ketone and the solution was washed with aqueous sodium borate solution and then methyl isobutyl ketone and water were removed by distillation. This purified material was combined with the other ingredients to prepare the capped polyisocyanate crosslinker in a manner similar to that of Examples IA and IIA above.

A cationic electrodeposition bath was prepared as shown in Table II below.

Example IV

This example series illustrates the capping of isophorone diisocyanate (IPDI), a sluggishly curing isocyanate normally requiring high temperatures for unblocking, with 2-(2-hydroxyethoxyphenol) and 2-(2-hydroxypropoxy phenol) capping materials.

Example IVA

This example illustrates IPDI capped with 2-(2-hydroxyethoxy phenol).

A main vehicle was prepared as shown in Table I above. The capped polyisocyanate crosslinker was prepared from the following ingredients for the preparation of the Main Vehicle of Table I:

| Ingredients | Parts by weight |
|---|---|
| 2-Hydroxy ethoxy phenol | 462.51 |
| Methyl isobutyl ketone | 252.87 |
| Dibutyltin dilaurate | 0.3 |
| Isophorone diisocyanate[10] | 333.00 |
| Methyl isobutyl ketone | 12 |

[10]Isophorone diisocyanate available commercially (IPDI) like those from Huls America, New Jersey or Arco Chemical Company.

The 2-Hydroxy ethoxy phenol capped polyisocyanate crosslinker was prepared in a manner similar to that of Example IA above but with the IPDI. A cationic electrodeposition bath was prepared from the components and in a manner shown in Table II below.

Example IVB

This example illustrates IPDI capped with 2-(2-hydroxypropoxyphenol).

A main vehicle was prepared as shown in Table I above utilizing the capped polyisocyanate crosslinker prepared from the following mixture of ingredients:

| Ingredients | Parts by weight |
|---|---|
| Catechol: 1 propylene oxide adduct of Example IIA, 64.4% solids in methyl isobutyl ketone | 652.48 |
| Methyl isobutyl ketone | 9.84 |
| Dibutyltin dilaurate | 0.25 |
| Isophorone diisocyanate[10] | 277.50 |
| Methyl isobutyl ketone | 2.5 |

[10]See footnote "10" above for Isophorone diisocyanate available cammercially (IPDI).

The Catechol: 1 propylene oxide adduct in methyl isobutyl ketone, was combined with the above ingredients to prepare the capped polyisocyanate crosslinker in a manner similar to that of Example IVA above.

A cationic electrodeposition bath was prepared for Example IVB as shown in Table II.

TABLE II

| | Example Number (Parts by Weight) | | | | | | | | |
|---|---|---|---|---|---|---|---|---|---|
| Material | Example IA | Example IB | Example IC | Example IIA | Example IIB | Example IIC | Example III | Example IVA | Example IVB |
| Above main vehicle of Example IA | 1261.1 | 1409.5 | 1409.5 | 1185.7 | 1412.9 | 1286.5 | 1331.2 | 1389.1 | 1452.2 |
| Co-resin 1[11] of | 170.6 | 169.1 | 169.1 | 166.8 | 166.8 | 166.8 | 166.8 | 166.8 | 166.8 |

TABLE II-continued

| | Example Number (Parts by Weight) | | | | | | | | |
|---|---|---|---|---|---|---|---|---|---|
| Material | Example IA | Example IB | Example IC | Example IIA | Example IIB | Example IIC | Example III | Example IVA | Example IVB |
| Example IA Butyl carbitol formal plasticizer[12] | 27.1 | 27.1 | 27.1 | 27.1 | 27.1 | 27.1 | 27.1 | 27.1 | 27.1 |
| Co-resin 2[13] of Example IA | 73.9 | 73.9 | 73.9 | 73.9 | 73.9 | 73.9 | 73.9 | 73.9 | 73.9 |
| Deionized water | 2073.0 | 1920.3 | 1923.2 | 2153.7 | 1926.5 | 2052.9 | 2008.2 | 1950.3 | 1887.2 |
| E-6066 Paste[14] | 194.3 | — | — | 192.8 | 192.8 | 192.8 | 192.8 | 192.8 | 192.8 |
| Above lead-free paste of Example IB Part (iv) | — | 200.1 | — | — | — | — | — | — | — |
| Above tin-free paste of Example IC Part (i) | — | — | 197.2 | — | — | — | — | — | — |
| Ethylene glycol monohexyl ether | 20.3 | — | — | 27.1 | 54.3 | 27.1 | 33.8 | — | — |
| Total | 3820.3 | 3800.0 | 3800.0 | 3827.1 | 3854.3 | 3827.1 | 3833.8 | 3800.0 | 3800.0 |

[11]An aqueous dispersion of a flexibilizer-flow control agent generally in accordance with U.S. Pat. No. 4,423,166 was prepared for use with the electrodepositable composition. The flexibilizer-flow control agent was prepared from a polyepoxide (EPON 828) and a polyoxyalkylene-polyamine (JEFFAMINE D-2000 from Texaco Chemical Co.). The flexibilizer-flow control agent was dispersed in aqueous medium with the aid of lactic acid and the dispersion had a resin solids content of 35.7% for Ex. IA, 36.0% for Ex. IB, IC, 36.5% for IIA, IIB, IIC, III, IVA and IVB.
[12]The reaction product of 2 moles of diethylene glycol butyl ether and 1 mole of formaldehyde, prepared as generally described in U.S. Pat. No. 4,891,111.
[13]A cationic microgel prepared as generally described in Examples A and B of U.S. Pat. No. 5,096,556, with the exception that acetic acid instead of lactic acid was used to disperse the soap of Example A, ethylene glycol butyl ether instead of MIBK was used as a solvent in the soap of Example A, and EPON 828 solution was added after stripping rather than before in Example B. The resin had a final solids content of 18.3%.
[14]A pigment paste commercially available from PPG Industries, Inc., containing 27.2% titanium dioxide, 1.4% carbon black, 15.9% aluminum silicate, 5.7% basic lead silicate, and 3.8% dibutyltin oxide.

The baths of Table II excluding ethylene glycol monohexyl ether, if used, were ultrafiltered to 20%, i.e., removing 20% of the total weight of the bath as ultrafiltrate and replacing the ultrafiltrate with deionized water. The ethylene glycol monohexyl ether, if used, was then added and stirred in for one hour. Smooth zinc phosphated steel panels of the same type were immersed separately in each of the baths and electrocoated with the particular electrodepositable composition at 275 volts for the time in minutes and at the temperature both noted in Table III below.

For Example IA a first set of panels were rinsed and baked 30 minutes at 340° F. (171° C.) to obtain a smooth coating of 0.85 mil (21.6μ). A second set of smooth zinc phosphated steel panels were immersed in the bath and electrocoated. These were allowed to air dry overnight followed by a 230° F. (110° C.) bake for 60 minutes. The electrodeposited coating was tested for cure as measured by acetone resistance. The weight loss during the 60 minutes at 230° F. (110° C.) bake was 13.4 percent. The theoretical amount of 2-(2-hydroxyethoxy phenol) is 13.3% assuming uniform deposition rates.

As noted in Table III for Examples IA, IB, and IC although there are several catalytic materials promoting cure (oleic acid, dibutyl tin oxide (DBTO) and lead silicate), cure at 230° F. (110° C.) would not be expected using conventional blocking alcohols and equal amounts of these catalytic materials. The other Examples of Table III show improved cure from the presence of the polyisocyanate curing agent capped with the agent of Structure I and/or II, hydroxyphenol monosubstituted with ether.

TABLE III

Summary of Electrodeposition Coating Parameters for Panels and Performance Properties of the Coated Panels

| Example No. | Crosslinker | Catalysts | E-coat time/temp/ film thickness[15] | ACETONE DAR's[19] | | | | | TGA[20], 2nd order wt. Loss, %/min/min x 10³ | |
|---|---|---|---|---|---|---|---|---|---|---|
| | | | | 60' @ 110° C. | 60' @ 121.1° C. | 30' @ 140.6° C. | 30' @ 154.4° C. | 30' @ 162.8° C. | 140.6° C. | 162.8° C. |
| IA | ethoxy catechol polyMDI[16] | Pb + Sn[18] | 2/38/21.6 | >100 (soft) | — | — | >100 (v.sl. mar) | >100 | — | — |
| IB | ethoxy catechol polyMDI[16] | Sn only[18] | 2/38/17.8 | 10 | — | — | >100 (v.sl. mar) | >100 (v.sl. mar) | 111 | 373 |
| IC | ethoxy catechol polyMDI[16] | Pb only[18] | 2/38/15.2 | 10 | — | — | >100 | >100 | 111 | — |
| IIA | catechol-1PO polyMDI[17] | Pb + Sn | 5/38/17.8 | — | >100 | >100 | >100 | >100 | 182 | 490 |
| IIB | -catechol 2PO polyMDI[17] | Pb + Sn | 2/25.3/22.9 | >100 (soft) | >100 (soft) | >100 (mar) | >100 (mar) | | 105 | 336 |

TABLE III-continued

Summary of Electrodeposition Coating Parameters for Panels and Performance Properties of the Coated Panels

| Example No. | Crosslinker | Catalysts | E-coat time/temp/film thickness[15] | ACETONE DAR's[19] | | | | | TGA[20], 2nd order wt. Loss, %/min/min × 10³ | |
|---|---|---|---|---|---|---|---|---|---|---|
| | | | | 60' @ 110° C. | 60' @ 121.1° C. | 30' @ 140.6° C. | 30' @ 154.4° C. | 30' @ 162.8° C. | 140.6° C. | 162.8° C. |
| IIC | catechol-3PO polyMDI[17] | Pb + Sn | 2/33.6/22.9 | >100 (v.sl. soft) | >100 (v.sl. soft) | >100 (mar) | >100 (mar) | >100 (mar) | 83 | 313 |
| III | -purified ethoxy catechol polyMDI | Pb + Sn | 2/36.1/22.9 | — | >100 (sl.mar) | >100 | >100 | >100 | 143 | |
| IVA | IPDI- 2(2-hydroxyethoxy phenol) | Pb + Sn | 2/35/22.9 | — | — | — | 60 | >100 (sl.soft) | 51 | 156 |
| IVB | IPDI-catechol-1PO[17] | Pb + Sn | 2/36.4/15.2 | — | — | — | >100 (soft) | >100 (sl.soft) | | 236 |

[15]Time in minutes, temperature in ° C., and film thickness in microns ("$\mu$").
[16]PAPI 2940 polymeric MDI see footnote 2 above.
[17]Catechol propylene oxide reaction product according to the Examples IIA< IIB< IIC< and IVB above.
[18]1% oleic acid on resin solids was present. which can have some catalytic effect
[19]Double rub Acetone Resistance is a test involving firmly rubbing an acetone saturated cloth back and forth across the cured coating surface. The number reported is the number of double rubs required to expose the metal surface. Greater than 100 double rubs were obtained.
[20]For the Thermo-Gravimetric Analysis (TGA) four-mil (101.6 microns, $\mu$) thick aluminum foil was electrocoated in the indicated electrodeposition bath. In this test the weight loss of a curing coating is monitored during heatup and cure for 30 minutes at the desired temperature. The linear portion of the plot of the rate of change of the rate of weight loss versus time at isothermal bake temperature is recorded. The constant slope of the curve is expressed as percent weight loss per minute per minute times 10³ (percent weight loss/min² × 10³). The higher the value, the faster the weight loss and the greater the cure rate. A minimum cure rate of 100 percent weight loss/min² × 10³ is desirable for acceptable cure.
[21]NA is not available.

Table III shows the results of improved cure at lower temperatures than that which is achieved with traditional capping agents useful at cure temperatures of 340° F. (171° C.) for blocked aromatic isocyanate and at cure temperatures of about 380° F. (193° C.) for blocked aliphatic isocyanates such as IPDI.

We claim:

1. An electrodepositable composition comprising (a) an active hydrogen-containing, cationic salt group-containing resin electrodepositable on a cathode; (b) a capped polyisocyanate curing agent; and, optionally, (c) a metal-containing catalyst; wherein the capped polyisocyanate curing agent comprises a polyisocyanate at least partially capped with a material having the structure:

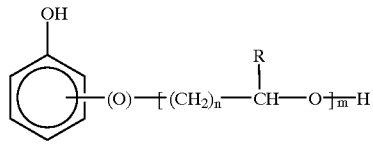

wherein n is a number from 1 to 10; m is a number from 1 to 10; and R is hydrogen or an alkyl or aryl group or substituted alkyl or aryl group having from about 1 to about 30 carbon atoms, wherein the aliphatic hydroxyl group of the structure is reacted with an NCO group of the polyisocyanate.

2. The electrodepositable composition of claim 1 wherein the cationic salt group-containing resin is derived from a polyepoxide.

3. The electrodepositable composition of claim 2 wherein the polyepoxide is a polyglycidyl ether of a polyhydric alcohol.

4. The electrodepositable composition of claim 2 wherein the cationic salt groups are amine salt groups.

5. The electrodepositable composition of claim 4 wherein the amine salt groups are derived from basic nitrogen groups neutralized with an acid selected from the group consisting of formic acid, acetic acid, lactic acid, phosphoric acid, sulfamic acid, and mixtures thereof.

6. The electrodepositable composition of claim 1 wherein the polyisocyanate is aromatic.

7. The electrodepositable composition of claim 1 wherein m is from 1 to 3, n is 1, and R is hydrogen or methyl.

8. The electrodepositable composition of claim 7 wherein n is 1, m is 1, and R is hydrogen.

9. The electrodepositable composition of claim 1 wherein the metal-containing catalyst is selected from the group consisting of tin-, lead-, bismuth-, manganese-, iron-, and zinc-containing compounds, and mixtures thereof.

10. The electrodepositable composition of claim 1 wherein the metal-containing catalyst is present in amounts of about 0.05 to 2 percent metal by weight, based on weight of total solids.

11. The electrodepositable composition of claim 10 further comprising lead.

12. The electrodepositable composition of claim 1 which is curable at a temperature range of about 200° F. to 400° F. (93.3° C. to 204.4° C.).

13. The electrodepositable composition of claim 1 wherein the capped polyisocyanate curing agent is present in the electrodepositable composition in an amount ranging from about 1 to about 60 percent by weight based on total weight of resin solids.

14. The electrodepositable composition of claim 13 wherein the capped polyisocyanate curing agent is present in the electrodepositable composition in an amount ranging from about 25 to 50 percent by weight based on total weight of resin solids.

15. The electrodepositable composition of claim 1 wherein the active hydrogen-containing, cationic salt group-containing electrodepositable resin is present in the electrodepositable composition in an amount ranging from about 40 to 90 percent by weight based on total weight of resin solids.

16. The electrodepositable composition of claim 1 wherein the capped polyisocyanate curing agent comprises a polyisocyanate at least partially capped with a material having the structure:

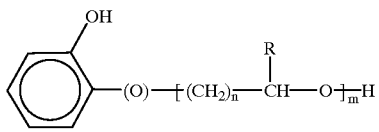

wherein n is a number from 1 to 10; m is a number from 1 to 10; and R is hydrogen or an alkyl or aryl group or substituted alkyl or aryl group having from about 1 to about 30 carbon atoms.

17. The electrodepositable composition of claim 16 wherein the capped polyisocyanate curing agent comprises the polyisocyanate at least partially capped with etherified catechol selected from the group consisting of: 2-(2-hydroxy(1-methyl-)ethoxy[(1-methyl)oxyethylene]$_{(Y-1)}$phenol, 2-(2-hydroxy(2-methyl-)ethoxy[(2-methyl) oxyethylene]$_{(Y-1)}$)phenol; 2-(2-hydroxyethoxy [oxyethylene]$_{(Y-1)}$)phenol; and mixtures thereof, wherein Y is a numeral of 1, 2, or 3 or a mixture of these compounds with any of these numerals.

18. A method of electrocoating an electroconductive substrate which serves as a cathode in an electrical circuit comprising said cathode and an anode immersed in an aqueous electrodepositable composition containing a cationic water dispersible resin, said method comprising passing an electric current between the anode and the cathode to cause the electrodepositable composition to deposit on the cathode as a substantially continuous film, and heating the electrodeposited film at an elevated temperature to cure the film, wherein the electrodepositable composition comprises (a) an active hydrogen-containing, cationic salt group-containing resin electrodepositable on a cathode; (b) a capped polyisocyanate curing agent; and, optionally, (c) a metal-containing catalyst; wherein the capped polyisocyanate curing agent comprises a polyisocyanate at least partially capped with a material having the structure:

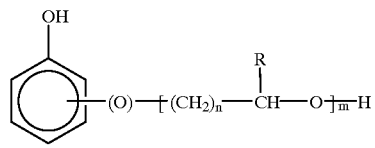

wherein n is a number from 1 to 10; m is a number from 1 to 10; and R is hydrogen or an alkyl or aryl group or substituted alkyl or aryl group having from about 1 to about 30 carbon atoms, wherein the aliphatic hydroxyl group of the structure is reacted with an NCO group of the polyisocyanate.

19. The method of claim 18 wherein the cationic resin is derived from a polyepoxide.

20. The method of claim 18 wherein the cathode is a steel substrate.

21. The method of claim 18 wherein the polyepoxide is a polyglycidyl ether of a polyhydric alcohol.

22. The method of claim 18 wherein the cationic salt groups are amine salt groups.

23. The method of claim 22 wherein the amine salt groups are derived from basic nitrogen groups neutralized with an acid selected from the group consisting of formic acid, acetic acid, lactic acid, phosphoric acid, sulfamic acid, and mixtures thereof.

24. The method of claim 18 wherein the polyisocyanate is aromatic.

25. The method of claim 18 wherein m is a number from 1 to 3, n is the number 1, and R is hydrogen or methyl.

26. The method of claim 25 wherein n and m are the number 1, and R is hydrogen.

27. The method of claim 18 wherein the metal-containing catalyst is selected from the group consisting of tin-, lead-, bismuth-, manganese-, iron-, and zinc-containing compounds, and mixtures thereof.

28. The method of claim 18 wherein the metal-containing catalyst is present in amounts of about 0.05 to 2 percent metal by weight, based on weight of total solids.

29. The method of claim 18 wherein the electrodepositable composition contains lead.

30. The method of claim 18 wherein the electrodepositable composition further comprises an acid functional compound.

31. The method of claim 18 wherein the electrodeposited film is heated to a temperature range of about 200° F. to 400° F. (93.3° C. to 204.4° C.) to cure the film.

32. The method of claim 18 wherein the capped polyisocyanate curing agent comprises a polyisocyanate at least partially capped with a material having the structure:

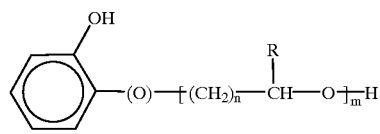

wherein n is a number from 1 to 10; m is a number from 1 to 10; and R is hydrogen or an alkyl or aryl group or substituted alkyl or aryl group having from about 1 to about 30 carbon atoms.

33. The method of claim 32 wherein the capped polyisocyanate curing agent comprises the polyisocyanate at least partially capped with etherified catechol selected from the group consisting of: 2-(2-hydroxy(1-methyl-)ethoxy[(1-methyl)oxyethylene]$_{(Y-1)}$)phenol, 2-(2-hydroxy(2-methyl-) ethoxy[(2-methyl)oxyethylene]$_{(Y-1)}$)phenol; 2-(2-hydroxyethoxy[oxyethylene]$_{(Y-1)}$)phenol; and mixtures thereof, wherein Y is a numeral of 1, 2, or 3 or a mixture of these compounds with any of these numerals.

34. A capped polyisocyanate curing agent capable of decapping at elevated temperatures for curing of active hydrogen containing polymers, comprising the reaction product of an etherified catechol selected from the group consisting of: 2-( 2-hydroxy(1-methyl-)ethoxy[(1-methyl) oxyethylene]$_{(Y-1)}$)phenol, 2-(2-hydroxy(2-methyl-)ethoxy [(2-methyl)oxyethylene]$_{(Y-1)}$)phenol, wherein Y is a numeral of 1, 2, or 3 or a mixture of compounds with any of these numerals, and polyisocyanate in amounts so that the equivalent ratio of aliphatic hydroxyl group of the etherified catechol to the NCO groups of the polyisocyanate can range from 0.05:1 up to 1:1, wherein the aliphatic hydroxyl group is reacted with the NCO group of the polyisocyanate.

* * * * *